(12) United States Patent
Kögler et al.

(10) Patent No.: US 6,520,505 B1
(45) Date of Patent: Feb. 18, 2003

(54) METHOD OF AND A SEALING ELEMENT FOR SEALING A GAP

(75) Inventors: Markus Kögler, Buchloe (DE); Franz Heimpel, Affing (DE); Silvia Huber, Neusäss (DE); Peter Vogel, Untermeitingen (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/715,548

(22) Filed: Nov. 17, 2000

(30) Foreign Application Priority Data

Nov. 19, 1999 (DE) .......................... 199 55 763

(51) Int. Cl.$^7$ ..................... H02G 15/013; E04B 1/682; F16L 5/00; B32B 31/00; B32B 3/00
(52) U.S. Cl. ................. 277/314; 277/316; 277/606; 277/627; 138/112; 52/221; 285/187; 285/215; 285/216; 156/293; 156/294; 264/262; 428/195
(58) Field of Search ................. 138/108, 112; 156/293, 294, 79, 77, 78, 305; 52/221; 277/314, 316, 603, 606, 607, 608, 609, 610, 625, 626, 627, 915; 285/196, 216, 215, 346, 381.1, 187; 428/195, 200; 264/261, 262

(56) References Cited

U.S. PATENT DOCUMENTS

| | | | | |
|---|---|---|---|---|
| 3,506,519 A | * | 4/1970 | Blumenkranz | 156/274.2 |
| 3,886,024 A | * | 5/1975 | Chase | 138/141 |
| 4,135,553 A | * | 1/1979 | Evans et al. | 138/103 |
| 4,194,750 A | * | 3/1980 | Sovish et al. | 277/603 |
| 4,508,368 A | * | 4/1985 | Blumenkranz | 156/294 |
| 4,898,630 A | * | 2/1990 | Kitoh et al. | 156/151 |
| 4,901,395 A | * | 2/1990 | Semrau | 16/2.2 |
| 5,129,979 A | * | 7/1992 | Nakayama et al. | 156/293 |
| 5,725,272 A | * | 3/1998 | Jones | 277/650 |
| 5,806,915 A | * | 9/1998 | Takabatake | 296/187 |
| 6,103,341 A | * | 8/2000 | Barz et al. | 277/605 |

FOREIGN PATENT DOCUMENTS

| | | | | |
|---|---|---|---|---|
| DE | 2729206 | * | 12/1996 | F16L/33/20 |
| JP | 59065670 | * | 4/1984 | F16J/15/10 |

* cited by examiner

*Primary Examiner*—Anthony Knight
*Assistant Examiner*—Vishal Patel
(74) *Attorney, Agent, or Firm*—Sidley Austin Brown & Wood, LLP

(57) ABSTRACT

A method for sealing a gap (4) between a leadthrough (2) provided in a constructional element (1) and an object (3) extending through the leadthrough (2), the method including placing in the gap (4) a plurality of elongate sealing elements, formed as hot melt elements (5) provided with heat-activated blowing agent, and applying heat to the hot melt element from outside; and a sealing element used by the method.

7 Claims, 1 Drawing Sheet

METHOD OF AND A SEALING ELEMENT FOR SEALING A GAP

BACKGROUND OF THE INVENTION

1. Field of the Invention

The present invention relates to a method of sealing a gap between a leadthrough provided in a constructional component and an object extending therethrough and including placing a sealing element into the gap. The present invention also relates to a sealing element for use in sealing a gap.

2. Description of the Prior Act

Gap sealing is necessary in the regions of housing leadthroughs through which tubes, pipes, cables are passed through from outside through openings in the walls. A gap between a tube or a cable and a leadthrough wall can be sealed by different methods. E.g., a mechanical seal, with which a rigid sealing element fills the gap and seals it by forming a form-locking connection with the wall and the tube or cable or by being pressed into the gap, can be used. Also a chemical seal can be used. With a chemical seal, the gap is filled with reactive system which hardens and closes the gap. As reactive systems, e.g., inorganic systems, such as mortar, or organic systems such as, e.g., sealing masses, polymer foams, and the like, can be used. Also, a chemical-mechanical seal can be used. With this seal, as a rule, a casing is placed in a gap and is filled with a chemical system of the type discussed above.

Mechanical solutions are expensive and time-consuming and require the use of tubes, cables, and leadthroughs having a predetermined diameter. This drawback is absent in chemical systems filling the gaps, such as sealing mass, foam, mortar. However, the chemical systems do not provide a lasting sealing against fluids or water. In addition, the treatment of liquid chemical components is often accompanied by soiling, contamination, increased health risks, ecological problems, presence of dirt residues, and the like.

Accordingly, an object of the present invention to provide a method of and a sealing element for sealing gaps which would insure a more rapid and easier sealing of gaps in leadthroughs having different diameters and with different diameter tubes extending therethrough, without affecting, in any significant manner, the environment.

SUMMARY OF THE INVENTION

This and other objects of the present invention, which will become apparent hereinafter, are achieved by providing a method of sealing a gap between a leadthrough provided in a constructional element and an object extending through the leadthrough and including placing in the gap at least one sealing element formed as a hot melt element provided with heat-activated blowing agent, and applying heat to the hot melt element from outside; and by providing a sealing element consisting of a hot melt mass provided with a heat-activated blowing mass.

Solid, e.g., elongate bar-shaped, hot melt elements, which are formed of an expandable material, are inserted in a gap between the leadthrough wall and at least one object extending through the leadthrough and are stacked there. The number of the hot melt elements insertable in a gap depends on the gap size. After the gap has been filled with the hot melt elements to a most possible extent, the elements are heated. The hot melt elements melt, expand and, then, become hardened again. As a result, the remaining empty spaces of the gap become sealed and lastingly closed. The hot melt material resists most of the fluids and, in particular, water, so that the sealed gap is also fluid-tight.

The hot melt element according to the present invention is formed of hot melt polymers, e.g., on epoxy or PUR basis. The hot melt element can be produced in bar-shaped form or any other suitable form. In addition, the hot melt element contains a heat-activated blowing agent. As a blowing agent, any substance can be used which contains components that, upon being heated, assume a gaseous form that splits off. E.g., nitrogen can be used as a blowing agent. Thus, as a heat-activated blowing agent, solid substances can be used which, upon reaching a predetermined temperature, decompose as a result of separation of the heated gas. The blowing agent should be uniformly distributed in the hot melt element. Blowing agent compositions, which contain organic compounds or nitrogen, e.g., such as azoic compounds, hydrazial, and the like, can be used.

However, microencapsulated fluid motive agents can also be used as a heat-activable flowing agents. To this type of agents, such compounds as pentan, i-butan, etc. belong.

According to an advantageous embodiment of the present invention, the hot melt element contains a heat-activated or blocking hardener that insures that after solidification in its expanded condition, the condition of the seal becomes irreversible. As a temperature activated or blocking hardener, e.g., a chemical blocking hardener such as a hidden amine, or a mechanical blocking hardener that, e.g., is microencapsulated, can be used.

For activation of a hot melt element, a heat should be applied thereto and uniformly distributed over the entire element. For distribution of heat in a hot melt element, e.g., metallic fibers can be embedded therein. In this case, the heat can be applied from outside, e.g., in a form of hot air supplied by a drier. The heat would propagate through the hot melt element in its longitudinal direction through the metallic fibers in a form of a heat flux. After the application of heat from outside, the heat is distributed through the metallic fibers uniformly over the hot melt element and melts it. In the melt, the heat-activated blowing agent is activated, which results in an increase of the volume of the hot melt element. In case a hardener is present, it becomes activated upon the temperature reaching a pre-determined value. Upon cooling, the foam-shaped material of the hot melt element solidifies, and the leadthrough becomes firmly and fluid-tightly closed.

According to a further embodiment of the present invention, the hot melt element can contain thermal cells. These cells can contain chemicals which, upon being activated, react exothermally and give up heat. This heat likewise can be distributed over the element through the metallic fibers. In an ideal case, the reaction of the hot melt element polymers with the heat-activated or blocking hardener releases, as a result of an exothermal reaction, so much heat that this heat is sufficient for initiation of a further autonomous reaction in form of a chain reaction. The activation of the thermal cells can again be effected by feeding heat from outside for a short time.

To facilitate handling of the bar-shaped sealing elements or the hot melt elements, they are connected with each other in form of a belt along their longitudinal edges. In this case, they can be placed around of a rod-shaped object between the object and the leadthrough wall one or more times, dependent on the size of the gap. Thus, a sample placing of sealing elements in the gap is insured.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENT

Figure 1:
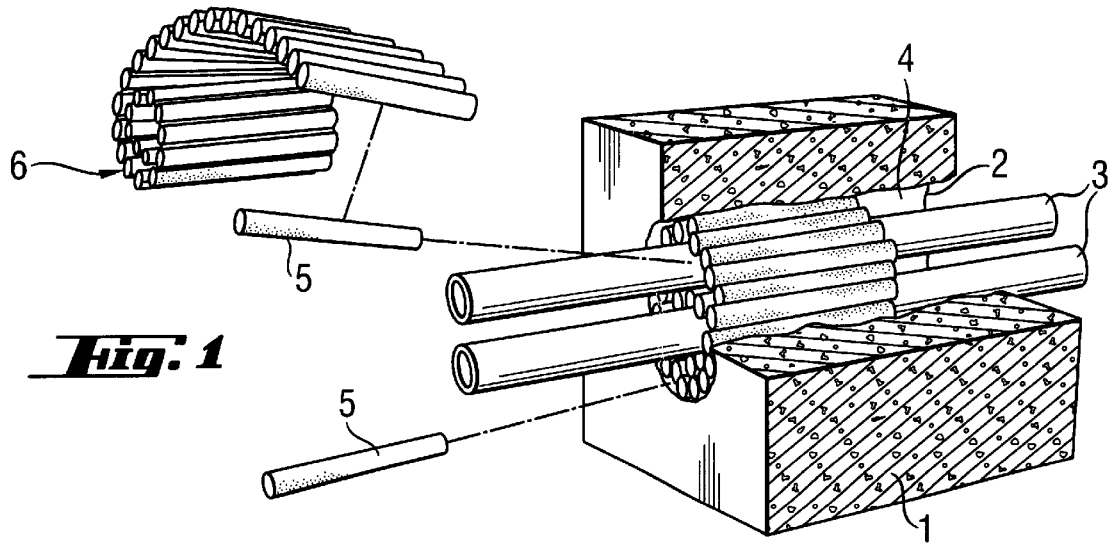
FIG. 1 a perspective view illustrating filling of a gap between a wall of a leadthrough and two pipes extending therethrough in accordance with the method according to the present invention, using a sealing element according to the present invention.

FIG. 1 shows a leadthrough 2 provided in a constructional element 1, e.g., a wall of a building. Two rod-shaped elements 3, e.g., two tubes 3, extend through the leadthrough 2. A gap 4 is formed between the wall of the leadthrough 2 and the tubes 3.

For sealing the gap 4, elongate bar-shaped hot melt elements 5 are pushed from one side of the wall into the gap 4. The hot melt elements 5 can be taken from a belt formed of hot melt elements 5.

Figure 2:
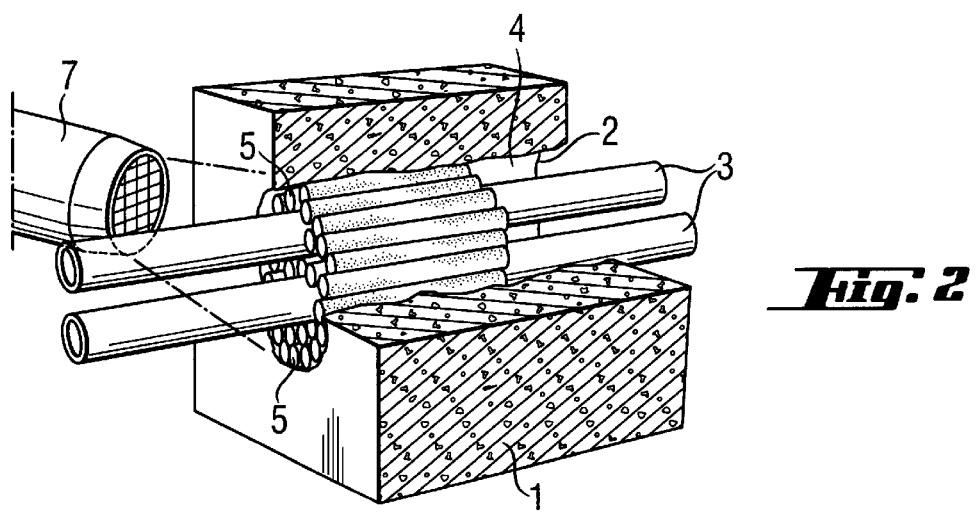
FIG. 2 a view similar to that of FIG. 1 illustrating heating of the sealing element with hot air.
Figure 3:
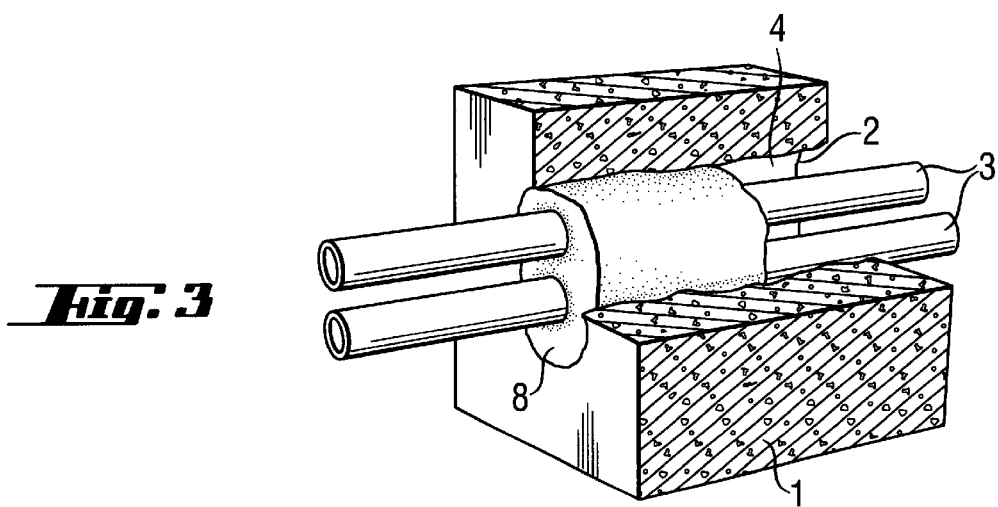
FIG. 3 a view similar to that of FIGS. 1–2 showing complete sealing of the gap.

After the gap 4 is filled with the hot melt elements 5, they are heated. As shown in FIG. 2, the hot melt elements 5 are heated with a stream of hot air applied to the end surfaces of the hot melt elements 5. For applying hot air, a drier 7 is used. The heat is uniformly distributed in the hot melt elements 5 with metal fibres provided in each hot melt element 5. The heat activates a blowing agent contained in the hot melt rods 5. The hot melt elements 5 can also contain thermal cell for obtaining heat as a result of exothermal reaction.

Upon being heated, the hot melt elements 5, which fill the gap 4, blow up and completely seal the gap 4, making it, in particular, fluid-tight. As a result, a plug 8 which consists of a melted, solidified mass of a hot melt material, is formed. The plug 8 sealingly surrounds the tubes 3 and is glued to the wall of the leadthrough 2, which results in a rigid setting of the plug 8 in the leadthrough 2.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A method for sealing a gap (4) between a leadthrough (2) provided in a constructional element (1) and an object (3) extending through the leadthrough (2), the method comprising the steps of providing a plurality of elongate, bar-shaped hot melt elements (5) containing a heat-activated blowing agent; filling the gap (4) with the elongate, bar-shaped hot melt elements (5) by inserting the hot melt elements (6) in a longitudinal direction of the gap (4); and applying heat to the hot melt elements for melting and expanding the hot melt elements (5), whereby upon hardening of the hot melt elements (5), after application of heat stopped, the gap (4) between the leadthrough (2) and the object (3) becomes sealed.

2. A method according to claim 1, wherein the heat applying step includes applying heat from outside.

3. A method according to claim 1, wherein the providing step includes providing elongate, bar-shaped hot melt elements further including metallic fibers for distributing the heat applied thereto.

4. A flexible belt-shaped assembly for sealing a gap (4) between a leadthrough (2) provided in a constructional element (1) and an object (3) extending through the leadthrough (2), the assembly comprising a plurality of elongate, bar-shaped hot melt elements (5) containing a heat-activated blowing agent and connected with each other along longitudinal edges thereof.

5. An assembly according to claim 4, wherein the hot melt elements further comprise metallic fibers for distributing heat throughout the elements.

6. An assembly according to claim 4, wherein the hot-melt elements comprise thermal cells for generating heat.

7. An assembly according to claim 4, wherein the hot melt elements comprise a hardening agent.

* * * * *